Aug. 13, 1963

J. MERCIER 3,100,508

CONTROL VALVES

Filed May 31, 1961

INVENTOR.
JEAN MERCIER

BY

Dean, Fairbanks & Hirsch
ATTORNEYS

---

3,100,508
CONTROL VALVES
Jean Mercier, 1185 Park Ave., New York, N.Y.
Filed May 31, 1961, Ser. No. 113,833
10 Claims. (Cl. 137—625.66)

This invention relates to the art of control valves, more particularly of the type to control the flow of hydraulic fluid.

As conducive to an understanding of the invention it is noted that where a hydraulic actuator is used to move a member, and the flow of fluid to the hydraulic actuator is controlled by a valve that, when actuated, immediately permits rapid flow of fluid to the actuator, if only slight movement is required of the member to a predetermined position, it is likely to overshoot such position and where the valve is then actuated in the opposite direction to bring the member back to the desired position, undesired hunting of the member about such position will occur.

It is accordingly among the objects of the invention to provide a valve for controlling the flow of hydraulic fluid, which valve is relatively simple in construction and not likely to become deranged and which will initially provide flow of fluid at a relatively slow rate to the hydraulic actuator for correspondingly slow movement of the member controlled thereby so that hunting of said member is substantially eliminated.

Another object of the invention is to provide a valve of the above type which will initially provide flow of fluid at a relatively slow rate to the hydraulic actuator when the member controlled thereby is only required to be moved a relatively small amount and which, if such member is required to be moved a relatively large amount, will initially provide a relatively slow rate of flow and then a relatively large rate of flow to the actuator.

Another object is to provide a valve of the above type which will initially provide continuous flow of fluid to the hydraulic actuator for corresponding movement of the member controlled thereby and thereupon when an increase in the rate of movement of the member is desired will slowly increase the rate of flow to the actuator so that said member will attain the new desired rate of movement without hunting.

According to the invention, these objects are accomplished by the arrangements and combination of elements hereinafter described and more particularly recited in the claims.

Figure 1:
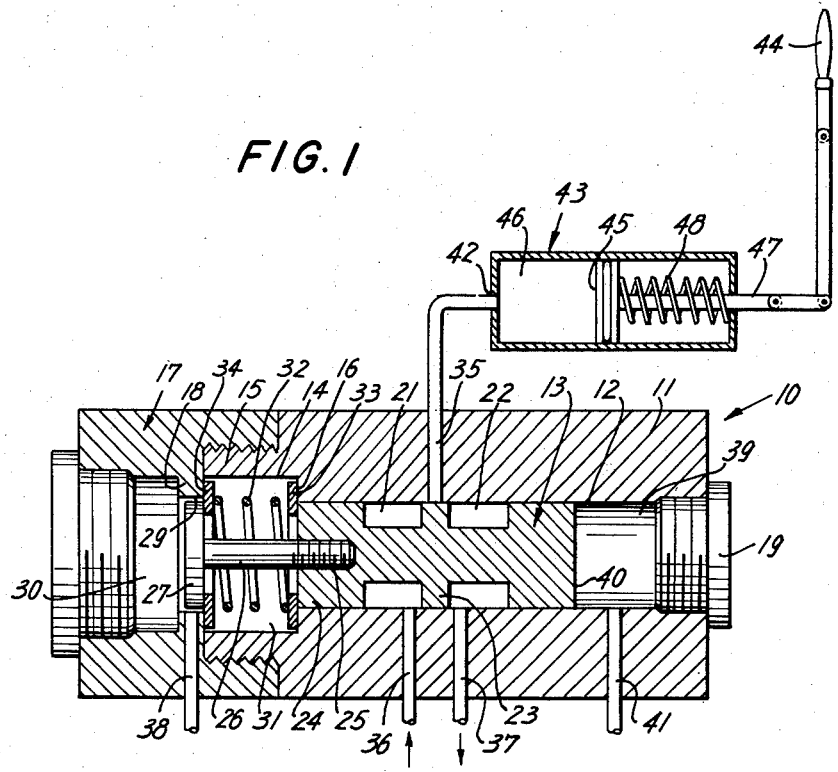
Figure 2:
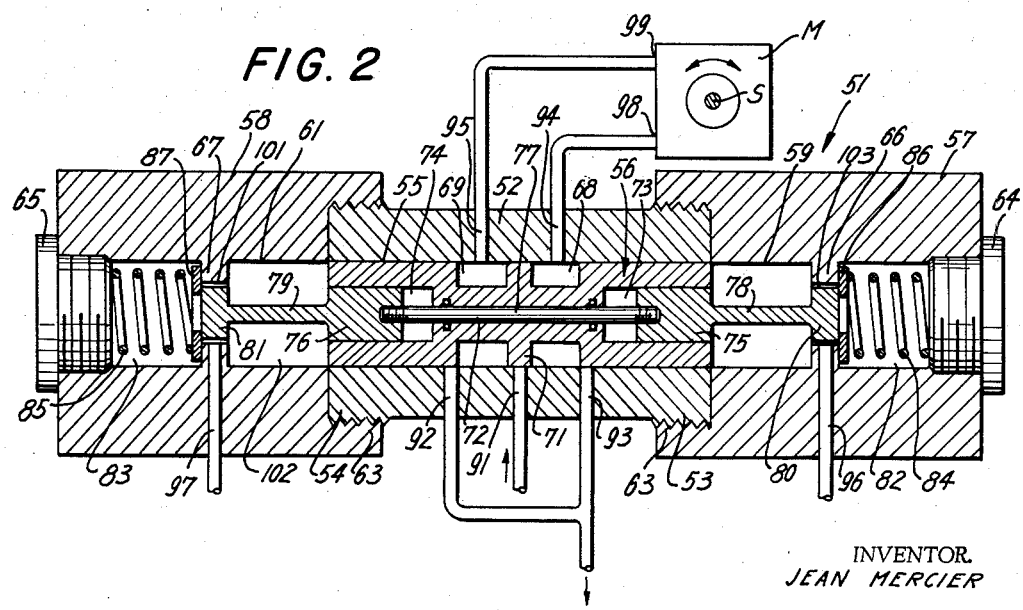

In the accompanying drawings in which are shown one or more of various possible embodiments of the several features of the invention, FIG. 1 is a longitudinal sectional view of a three way valve designed to control an hydraulic actuator, and FIG. 2 is a view similar to FIG. 1 of a four way valve.

Referring now to the drawings, as shown in FIG. 1, the valve 10 comprises a casing 11 having a cylindrical bore 12 in which a piston 13 is slidably mounted.

The bore 12 is of enlarged diameter as at 14 at the end 15 of the casing, defining an annular shoulder 16.

The end 15 of the casing is of reduced diameter on its outer periphery and is threaded to receive the correspondingly threaded end of a hollow cap 17, the latter having an internal annular flange 18 longitudinally spaced from shoulder 16. The end of the bore 12 remote from cap 17 is closed as by a plug 19.

The piston 13 has two longitudinally spaced peripheral grooves 21, 22 with the portion 23 of the piston 13 therebetween defining a closure portion.

The end 24 of the piston adjacent end 15 of the casing 11, has an axial threaded recess 25 adapted to receive the correspondingly threaded end of a stem 26 which has a valve head 27 secured to its free end defining chambers 30 and 31 on each side thereof. As is clearly shown in FIG. 1, the diameter of head 27 is sufficiently smaller than the internal diameter of annular flange 18, so that a restricted passageway 29 will be provided when the head 27 is aligned with flange 18.

Positioned in the chamber 31 defined between flange 18 and shoulder 16 and encompassing stem 26 is a coil spring 32 which reacts against washers 33, 34.

Thus, referring to FIG. 1, the spacing between the end 24 of piston 13 and valve head 27 is such that when the coil spring is fully extended, limited by the abutment of washers 33, 34 against shoulder 16 and flange 18, the washers 33, 34 will also react against end 24 of piston 13 and valve head 27 and retain the latter aligned with flange 18.

In this position of the piston, closure portion 23 thereof will close control or outlet passage 35; annular grooves 21 and 22 will be aligned with pressure inlet passageway 36 and return passage 37 respectively; valve head 27 will be aligned with pilot passageway 38 and chamber 39 of the casing between the end 40 of piston 13 and plug 19 will be in communication with pilot passageway 41.

In the operation of the valve shown in FIG. 1 of the drawings, a source of fluid under pressure such as a pump is applied to passageway 36 and the return passageway 37 is connected to a suitable reservoir. The outlet passage 35 is connected to port 42 of a hydraulic actuator 43, for example, which controls the rudder of a ship. The actuator 43 illustratively is of the spring returned type and when the rudder 44 is in neutral position shown, the piston 45 of the actuator will also be in its intermediate position.

The valve 10 may be actuated remotely by means of fluid under pressure applied to either of the pilot passageways 38, 41.

Assuming that the ship is proceeding along a normal course with the actuator in the intermediate position shown, small deviations in the course of the ship should be corercted by a small movement of the rudder so that the ship does not swing widely. This is accomplished by the valve 10 shown in FIG. 1. Assuming that with the system in the neutral position shown, i.e., with passage 35 closed by portion 23 so that the fluid entrapped in chamber 46 of the actuator will retain the rudder in neutral position, ti is desired to move the rudder 44 say in a counterclockwise direction. To this end fluid under pressure is applied to pilot passageway 38. Since the valve head 27 is aligned with flange 18, only a very restricted passageway 29 is provided for the fluid under pressure flowing through passageway 38. This fluid under pressure will enter chambers 30 and 31.

With no fluid pressure in passageway 41 leading into chamber 39, it is apparent that when chambers 30 and 31 are under pressure, such fluid under pressure will react against the valve head 27 as well as the end 24 of the piston 13 and the force thereby exerted against the piston 13 will overcome the counterforce exerted by the coil spring 32 so that the piston 13 will start to move to the right.

At this time, it is to be noted that since the passageway 29 is relatively small, the fluid under pressure will be applied at a relatively slow rate so that movement of the piston 13 will also be at a relatively slow rate.

It is to be noted that as the piston 13 initially moves slowly to the right, the passageway 35 leading to the port 42 of actuator 43 will be cracked slightly by the portion 23 so that communication is afforded between the pump and the hydraulic actuator 43 through annular groove 21. Consequently, there will initially be applied to the hydraulic actuator 43, fluid under pressure from the pump at a relatively slow rate so that the piston rod 47 of the actuator will extend slowly to move the rudder slowly as desired.

In the system that the valve 10 would be used, the control pressure would be turned on and off by means of a conventional servo-system, either manually controlled by the helmsman or automatically controlled, depending upon the course of the ship. It is noted that in the system shown, once the rudder has been set to a particular position and flow of fluid under pressure to control passageway 38 is cut off, which with small deviations in the course of the ship will occur before the valve head 27 is moved clear of flange 18, the spring 32 will return the piston 13 to the neutral position shown, cutting off further flow of fluid under pressure from the pump to the actuator 43.

Since the system is a closed system and the portion 23 will close off the passageway 35, the actuator 43 will remain in its set position. Now, if it is desired to move the rudder 44 in the opposite direction, which is necessary when the ship has returned to its desired course so that it can proceed in such direction, the pilot pressure is applied to passageway 41. Since at the time that this operation would occur, the piston 13 would be in the neutral position shown, as pressure would be applied to chamber 39, to move piston 13 to the left of the neutral position, since there would be a restricted passageway at 29, the fluid in chambers 30, 31 would discharge slowly through passageway 38 which would now be connected to a reservoir, for example. When closure portion 23 initially cracked passageway 35, in the movement of piston to the left of the neutral position, there would be a slow bleeding of fluid from actuator 43 through annular groove 22 to return passageway 37, and the spring 48 of the actuator 43 would slowly return the rudder 44 to the intermediate position at which time the pressure to passageway 41 would be cut off.

In the event that the ship goes greatly off course or it is desired to effect relatively great movement of the rudder, fluid under pressure will be applied to say pilot passageway 38 for a longer period of time to move the piston 13 sufficiently to the right so that valve head 27 is completely clear of flange 18. As a result, the portion 23 will be moved completely clear of passageway 35 so that full flow of fluid under pressure will be provided from the pump to port 42 of the actuator. As a result, the rudder will rapidly be moved in the desired counterclockwise direction and when it has reached its desired position, flow of fluid to passageway 38 will be cut off.

Thereupon, when the ship is again on course, the rudder will be moved in the opposite direction as above described.

With the valve shown in FIG. 1, it is apparent that slow movement of the device controlled by the actuator may be accomplished without hunting and rapid movement may also be accomplished when necessary.

The system shown in FIG. 1 is useful where it is desired to attain a fixed position, that is, not to have a constant movement of the hydraulic actuator, but merely a movement to a given position and then remain at such position. In other words, the system shown in FIG. 1 would be useful in moving a rudder, for example, to a fixed position.

However, if the controlled member was a gun following an aircraft moving at different rates of speed, the system shown in FIG. 1 would not be useful since there would continue to be fluid under pressure applied to the pilot passageway 38. Initially, there would be slow movement of the gun due to the slow movement of the actuator and thereupon the continued application of such fluid under pressure, there would be complete opening of the restricted passageway 29 so that the hydraulic actuator would then move rapidly so that the gun would tend to move by or overshoot the target and would then hunt back and forth which would be undesirable for such an application.

This problem is taken care of by the embodiment shown in FIG. 2.

As shown in FIG. 2, the valve 51 comprises a casing 52 externally threaded at each of its ends 53, 54, said casing having a bore 55 in which a piston 56 is slidably mounted.

Secured to the ends of the casing 52 are closure caps 57, 58, each of which has an axial bore 59, 61 therethrough, the portions of which adjacent the piston being of diameter no less than that of the bore 55 of the casing 52. The ends 63 of the bores 59, 61 are of enlarged diameter and internally threaded so that they may be screwed on the correspondingly threaded ends of the casing 52.

The outer ends of each of the bores 59, 61 is closed by a screw plug 64, 65 and each of the bores has an internal annular flange 66, 67 longitudinally spaced from the associated plug 64, 65.

The piston 56 has two longitudinally spaced peripheral annular grooves 68, 69 with the portion 71 of the piston 56 therebetween defining a closure portion.

The piston 56 has an axial bore 72 therethrough of enlarged diameter at each end defining chambers 73, 74. Slidably mounted in each of said chambers is a piston 75, 76 connected by means of an axial rod 77. Each of the pistons has secured thereto axial stems 78, 79 extending in opposite directions and each mounting a valve head 80, 81 at its free end.

The lengths of rod 77 and stems 78, 79 are such that in the neutral position of the valve, each of the valve heads will be aligned with flanges 66 and 67 and the pistons will be free to move in either direction to move the valve heads clear of the associated flange.

Positioned in the chambers 82, 83 between the valve heads 80, 81 and the plugs 64, 65 respectively are coil springs 84, 85, one end of which reacts against the associated plug and the other against an associated washer 86, 87. Thus, when the washers are urged by the springs against the shoulders defined by flanges 66, 67, they will also react against the valve heads 80, 81 to retain them in the neutral position shown, i.e., aligned with the associated flanges 66, 67.

When the main piston 56 (which is movable independently of the auxiliary pistons 75, 76) is in the neutral position shown, the closure portion 71 thereof will close inlet passageway 91 to which a source of fluid under pressure such as a pump is connected. In addition, the piston 56 will close to return passageway 92, 93, and control passageways 94, 95 will be in communication with annular grooves 68, 69 respectively, said control passageways 94, 95 being connected to the ports 98 and 99 of a hydraulic motor M of the rotary type, for example.

The valve heads 80 and 81 when in neutral position will be aligned with pilot passageways 96, 97 which extend through flanges 66 and 67.

Referring to FIG. 2, assuming that it is desired to rotate the shaft S of motor M in one direction at a constant speed, fluid under pressure would be applied to pilot passageway 97, by means of a conventional servo control system, directed by radar, for example. As the pilot pressure passes at a relatively slow rate through the restricted passageway 101 defined between valve head 81 and flange 67, into chambers 83 and 102, it will react against the auxiliary piston 76 and the end of main piston 56.

As a result, the piston 56 will move slowly to the right due to the restricted passageways 101 and 103. As a result, the portion 71 will crack the passageway 91 and fluid under pressure will be directed at a slow rate from the pump, through annular groove 69 and passageway 95 into port 99 of the motor M slowly to rotate the shaft S thereof.

In addition, such movement of piston 56 will also crack passageway 93 to connect port 98 of the motor M to return.

When once the aircraft is being tracked, the pilot pressure to passageway 97 will be cut off and the compressed coil spring 84 will move the valve heads 80 and 81 back to their neutral position, such movement being damped as the chambers 73, 74 are filled with oil due to seepage past the pistons 75, 76 in such chambers. However, as the chambers 83 and 102 are filled with fluid, no movement will be imparted to the piston 56 and it will remain in the set position so that fluid at a relatively slow rate, depending upon the degree of movement of closure portion 71, will be fed to port 99 of hydraulic motor M and the port 98 thereof will discharge at a relatively slow rate through passageway 93.

Thus, the gun, for example, controlled by motor M will track the aircraft without hunting.

Assuming that there should be an increase in the speed of the aircraft so that it is desired to increase the speed at which the gun is following the aircraft, it is clear that the passageway 91 would have to be opened further to permit faster movement, that is, a greater rate of flow of fluid into the motor M, so that it would follow at a faster rate of speed. Due to the servo control system, pilot fluid under pressure at an increased rate would now be applied to pilot passageway 97, the rate of flow of such fluid being determined by the change in the speed of the aircraft rather than its absolute speed.

As a result, the main piston 56 would be moved further to the right thereby giving greater flow to the motor M. When the servo control system has detected that the plane is again being followed at the correct rate of speed, the fluid under pressure to passageway 97 would again be cut off and at this time the main piston would be retained in the new position corresponding to the greater rate of speed, so that the speed of rotation of the motor M would be at such greater rate of speed and all this without possibility of hunting at the particular moment of adjustment, for, as clearly pointed out, when the movement of the main piston 56 is effected, it is through the restricted passageway 101.

It is of course to be understood that if it is desired to move the gun in the opposite direction, the same operation previously described would be repeated, but in this case the fluid under pressure would be applied to the pilot passageway 96.

With the valve constructions above described, a hydraulic actuator may be controlled to effect movement of a suitable movable member to a given position without hunting thereof and also will permit continuous movement of a movable member and changes in the speed of movement without hunting.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A valve comprising a casing having pressure inlet, pressure control and pilot passageways, a main piston slidably mounted in said casing and controlling said pressure inlet and control passageways, said main piston being movable between a first position in which communication is cut off between said pressure inlet and control passageways and a second position in which communication is afforded between said pressure inlet and control passageways, a valve head slidably mounted in said casing on one side of said piston, resilient means normally retaining said valve head in position to define a restricted passageway in said casing in communication with said pilot passageway, said casing having a chamber in communication with said restricted passageway, said valve head and said main piston being operatively exposed in said chamber for movement thereof when fluid under pressure flows into said chamber through said pilot passageway thereby respectively to increase the size of said restricted passageway and to provide communication between said pressure inlet and control passageways.

2. The combination set forth in claim 1 in which said casing has a second valve head slidably mounted in said casing on the other side of the main piston and a second pilot passageway, additional resilient means normally retaining said second valve head in position to define a second restricted passageway in said casing in communication with said second pilot passageway, said casing having a second chamber in communication with said second restricted passageway, said second valve head and said other side of the main piston being operatively exposed in said second chamber for movement thereof when fluid under pressure flows into said second chamber through said second pilot passageway, means rigidly connecting said two valve heads to move in unison independently of the movement of said main piston, said casing having two pressure control passageways and two fluid return passageways, said main piston, when pressure is applied to said first pilot passageway, providing communication between said inlet and one of said control passageways and between the other control passageway and one of said return passageways and when pressure is applied to said second pilot passageway, providing communication between said inlet and the other control passageway and between the first control passageway and the other return passageway.

3. The combination set forth in claim 2 in which an additional chamber is provided in said casing outwardly of said first and second chamber respectively, said resilient means being positioned in said additional chambers, stop means in each additional chamber limiting the expansion of the associated resilient means, said resilient means reacting respectively against an associated valve head normally to retain said valve heads in said position to define said restricted passageways.

4. The combination set forth in claim 2 in which said piston has an axial bore therethrough of enlarged diameter at each end, an auxiliary piston is slidably mounted in each of said large diameter portions, a rod in said bore rigidly connecting said auxiliary pistons, and a stem rigidly connecting said valve heads to an associated piston, said enlarged diameter portions and said rod being of length to permit axial movement of said auxiliary pistons.

5. The combination set forth in claim 1 in which said casing has a fluid return passageway which is cut off when said main piston is in its first position.

6. The combination set forth in claim 1 in which said main piston and said valve head move in unison.

7. The combination set forth in claim 1 in which the movement of said valve head and said main piston are independent.

8. The combination set forth in claim 1 in which said casing has a second chamber and a second pilot passageway leads into said second chamber, the end of the main piston remote from that exposed in the first chamber being operatively exposed in the second chamber.

9. The combination set forth in claim 1 in which said casing has a single pressure control passageway and a single fluid return passageway, said casing has a second chamber and a second pilot passageway leads into said second chamber, the end of the main piston remote from that exposed in the first chamber being operatively exposed in the second chamber, said piston when fluid under pressure is applied to said first pilot passageway providing communication between said inlet and control passageways and when fluid under pressure is applied to said second fluid passageway providing communication between said control and return passageways.

10. The combination set forth in claim 1 in which said resilient means is positioned in said chamber, stop means in said chamber limiting the expansion of said resilient means, said valve head is longitudinally spaced from said piston and rigidly secured thereto, said resilient means reacting against said valve head and said piston normally to retain said valve head in said position to define said restricted passageway and said piston in said first position.

References Cited in the file of this patent

FOREIGN PATENTS

| | | |
|---|---|---|
| 15,914 | Great Britain | July 18, 1903 |
| 539,866 | Great Britain | Sept. 26, 1941 |
| 626,924 | Germany | Mar. 7, 1936 |